United States Patent [19]

Papsdorf

[11] 4,254,617
[45] Mar. 10, 1981

[54] COMBUSTION UNIT

[75] Inventor: Kurt R. Papsdorf, Florida, South Africa

[73] Assignee: Deams (Proprietary) Limited, Johannesburg, South Africa

[21] Appl. No.: 959,154

[22] Filed: Nov. 9, 1978

[30] Foreign Application Priority Data

Nov. 29, 1977 [ZA] South Africa ..................... 77/7096
May 16, 1978 [ZA] South Africa ..................... 78/2807

[51] Int. Cl.³ .......................... F02C 3/22; F02C 5/00
[52] U.S. Cl. ............................. 60/39.46 G; 60/39.76; 60/39.81; 137/533.17
[58] Field of Search .................. 60/76, 78, 79, 80, 81, 60/39.76, 39.81, 39.46 G; 137/528, 529, 533.17, 538

[56] References Cited

U.S. PATENT DOCUMENTS

| | | | |
|---|---|---|---|
| 1,283,228 | 10/1918 | Bozec | 137/533.17 |
| 1,310,668 | 7/1919 | Miller | 60/39.8 |
| 1,913,593 | 6/1933 | Hofmann | 60/39.76 |
| 2,748,798 | 6/1956 | Withrow | 137/533.17 |
| 4,040,249 | 8/1977 | Kahle et al. | 60/39.51 H |

Primary Examiner—Louis J. Casaregola
Attorney, Agent, or Firm—John H. Mulholland

[57] ABSTRACT

This invention relates to combustion units in which combustible fluids are fed to a combustion chamber and burnt, and in which the resulting combustion gases are used to drive a power output. The combustion unit includes a combustion chamber; means for igniting combustion fluids in the combustion chamber; power output means drivable by the resulting combustion gases; a compressor for supplying air to the combustion chamber; and a gas supply including a control valve for supplying fuel gas to the combustion chamber for burning in the air, the control valve having a control chamber, an outlet member extending into the control chamber, an outlet passage in the outlet member and defining an outlet from the control chamber, said passage communicating with the combustion chamber to supply fuel gas to the combustion chamber, an inlet for supplying fuel gas into the control chamber and capable of communicating with the outlet, a valve seat in the control chamber and surrounding the inlet, and a shuttle piston movable along the outlet member, the shuttle piston having a closure surface for engaging the valve seat to close the inlet, wherein fuel gas flowing into the inlet holds the closure surface away from the valve seat and thus flows through the control chamber to the outlet and to the combustion chamber until combustion gases in the combustion chamber create a back-flow to the outlet at a pressure sufficiently in excess of the pressure at the inlet to move the closure surface towards the valve seat and to close the inlet.

15 Claims, 6 Drawing Figures

COMBUSTION UNIT

This invention relates to combustion units in which combustible fluids are fed to a combustion chamber and burnt, and in which the resulting combustion gases are used to drive a power output.

The inventon is primarily concerned with combustion units in which air is supplied to the combustion chamber by compressed air, a fuel is mixed with the air and burnt, and the resulting combustion gas is directed from the combustion chamber against power output element such as a turbine rotor. An example of such a device is the diesel-burning turbine No. T.16A or T.216, supplied by Klöckner-Humboldt-Deutz A.G. In this turbine, an atomised jet of diesel fuel is fed into the combustion chamber from one end of the combustion chamber and air is forced into the combustion chamber by a compressor. The resulting mixture is ignited by a suitable sparking plug. This results in a spearhead-type of combustion pattern within the combustion chamber. The resulting combustion gases are directed against a rotor to drive the rotor and are exhausted from the rotor by a suitable exhaust outlet.

This diesel turbine has considerable industrial application but the exhaust generally contains an undesirable amount of combustible fuel and is at a relatively high temperature. Furthermore, if a gas such as propane is to be used as the fuel, it is not satisfactory simply to feed a continuous jet of gas into the combustion chamber particularly in view of the possibility of blow-back of combustion gases and air into the gas supply.

It is therefore an aim of this invention to provide a combustion unit for using gaseous fuel and which is capable of more efficient combustion while overcoming the problems of supplying gaseous fuel to the combustion chamber.

According to the invention there is provided a combustion unit for using gaseous fuel, the unit including a combustion chamber; means for igniting combustion fluids in the combustion chamber; power output means drivable by the resulting combustion gases; a compressor for supplying air to the combustion chamber; and a gas supply including a control valve for supplying fuel gas to the combustion chamber for burning in the air, the control valve having a control chamber, an outlet member extending into the control chamber, an outlet passage in the outlet member and defining an outlet from the control chamber, said passage communicating with the combustion chamber to supply fuel gas to the combustion chamber, an inlet for supplying fuel gas into the control chamber and capable of communicating with the outlet, a valve seat in the control chamber and surrounding the inlet, and a shuttle piston movable along the outlet member, the shuttle piston having a closure surface for engaging the valve set to close the inlet, wherein fuel gas flowing into the inlet holds the closure surface away from the valve seat and thus flows through the control chamber to the outlet and to the combustion chamber until combustion gases in the combustion chamber create a backflow to the outlet at a pressure sufficiently in excess of the pressure at the inlet to move the closure surface towards the valve seat and to close the inlet.

The shuttle piston in the control valve prevents combustion gases from flowing the wrong way through the control valve while permitting fuel gas to flow to the combustion chamber for burning in the air supply from the compressor as soon as the pressure of gases within the combustion chamber has dropped sufficiently.

The shuttle piston may contain a substantially cylindrical cavity receiving the outlet member and this cavity may have an inner peripheral wall which is slightly spaced from the member so that a flow path is formed by an annular space between the inner wall of the piston and the outer wall of the outlet member. It has been found that the wear on the shuttle piston can be minimised when such an arrangement is used and it is believed that this is because the air in the flowpath forms a cushion on which the piston moves. The outlet members serves as a guide for the shuttle piston.

If the control chamber is cylindrical and the outer surface of the piston can slidably engage the wall of the chamber, the piston may contain grooves to place the inlet in fluid communication with the flow path. The cross-sectional area of the grooves and the dimension of the flow path between the outlet member and the shuttle piston may then be selected to provide a satisfactory flow rate through the control valve.

The valve seat in the control chamber may be frusto-conical and the shuttle piston may then be provided with a complementary surface for engaging the valve seat to close the inlet. Because of the high speed at which the shuttle piston will move, it is not essential to have seals acting between the valve seat and the shuttle piston. Furthermore, springs or like restraining elements acting against the shuttle piston are avoided to allow relatively free movement of the shuttle piston within the control chamber while reducing the possibility of wear or breakage of parts within the chamber.

The combustion chamber can be tubular with a header at one end and the compressor can be arranged for feeding air through an air supply path to the header. The gas supply can then feed the gas to the header to mix with air from the flow path within the heder before the mixture enters the combustion chamber. While a limited amount of gas may be fed directly into the combustion chamber, the mixing of gas and air within the header can considerably increase the efficiency of the combustion compared with the conventional spearhead-type of combustion pattern. In practice, it has been found that combustion occurs across a relatively broad front extending across the combustion chamber, providing for improved combustion and increased expansion time. The unit can have a primary housing with an outside wall and an inner peripheral wall defining the combustion chamber, the header being mounted on the outside wall and the air supply path being provided between the inner and outer walls, and openings can then be provided in the inner wall at suitable locations for permitting inflow of gas and air into the combustion chamber. The provision of the air supply path between the inner and outer walls also enables the air to be preheated as it passes the inner wall.

The power output means may comprise a rotor provided at the opposite end of the combustion chamber to the header for being rotated by combustion gases flowing from the combustion chamber. The rotor may be rotatable in a rotor chamber about an axis substantially perpendicular to but offset from the combustion chamber axis, the combustion chamber extending non-radially into the rotor chamber for impinging on the rotor to rotate the rotor. A plurality of blades may be located about the periphery of the rotor and each blade may be curved as it extends along the rotor axis for deflecting combustion gases towards a diffuser forming an exhaust outlet leading from the rotor chamber. In a practical form of the unit, it has been found that the exhaust from the unit has been relatively low in air-polluting products and that a substantially lower temperature than the exhaust gas from the diesel turbine referred to above.

It has been found that the speed of operation of the unit can be effectively controlled by inserting a supply valve in the supply line between the gas source and the control valve, the supply valve including a flow passage and a regulator for varying the flow area of the flow passage. The suppy valve can then control the speed of the unit by adjusting the flow area and thus controlling the supply of fuel gas to the control valve. Because of the quick response of the control valve to change in pressure, it has been found that this arrangement can permit relatively quick control of the speed of a turbine rotor driven by the combustion gases from the combustion chamber.

In one aspect, the invention also extends to a combustion unit comprising a tubular combustion chamber; a header at one end of the chamber; an air supply path for supplying air into the header; a compressor for feeding air through the air supply path to the header; a supply and control system for feeding gas to the header to mix with air from the flow path; means for igniting air-gas mixture flowing through the header and into the combustion chamber; and a rotor at an opposite end of the combustion chamber to be rotated by combustion gases flowing from the combustion chamber, the supply and control system including a gas source and a control valve including closure means for permitting gas to flow into said header when a back pressure force applied to said closure means by back pressure from the combustion chamber is less than a gas pressure force applied to the closure means by gas from the gas source, the closure means being operable to close off supply of gas from the gas source on the back pressure force exceeding the gas pressure force on the closure means.

An embodiment of the invention will now be described, by way of example, with reference to the accompanying drawings, in which.

Figure 1:
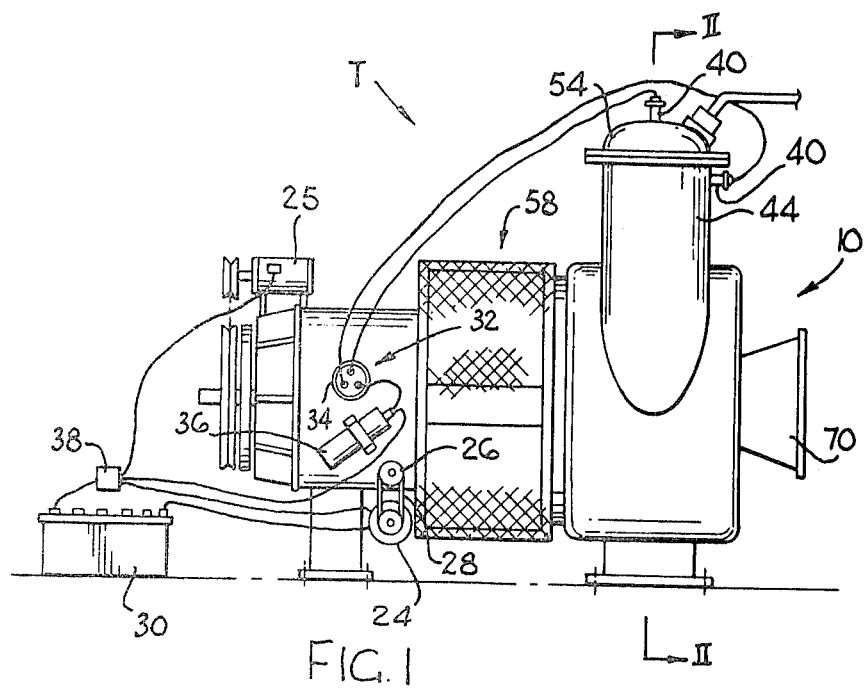
FIG. 1 is a schematic representation of a gas turbine engine.
Figure 2:
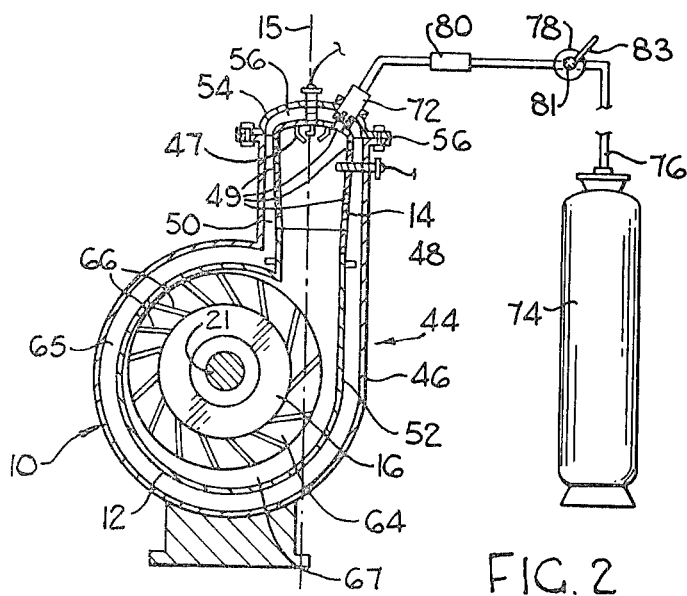
FIG. 2 is a partial cross-section through the engine of FIG. 1 on line II—II in FIG. 1.

The engine shown in the drawings comprises a turbine T having a housing 10 containing a rotor chamber 12 and a combustion chamber 14 extending along an axis 15 for supplying gases to drive a rotor 16 mounted in the rotor chamber. A compressor 18 is coupled to be driven with the rotor and is arranged to supply air under pressure to the combustion chamber. A reduction gearbox 20 is coupled to a shaft 22 on which the rotor is mounted and can thus be driven by the rotor. The shaft 22 is arranged along an axis 21 perpendicular to but offset from the axis 15.

A starter motor 24 is connected to a pulley 26 from the gearbox 20 by a fan belt 28 and can be switched to serve as a starter motor for starting the engine. A battery 30 is provided for initially driving the starter motor, the latter being charged by an alternator 25, in use.

A distributor system 32 including a distributor 34 and an ignition coil 36 is coupled to the generator by a suitable regulator 38 for intermittently supplying high voltage to sparking plugs 40. The distributor is actuated by a drive (not shown) in the gearbox 20.

In more detail, the housing 10 includes a primary cylindrical portion 44 having an outside wall 46. The combustion chamber has a perforated inner wall 48 containing openings 49 and spaced from the outer wall by an annular airflow path 50 and a cover including a central aperture 45 with fins 47 for swirling gases entering the chamber through the aperture. The gases can also enter the chamber 14 through the holes in the wall 48. As shown, the wall 48 has an upper part tapering slightly inwardly towards the rotor chamber 12.

The combustion chamber 48 is connected to the rotor chamber by a rotor chamber inlet 52 extending non-radially into the rotor chamber.

The primary cylindrical portion 44 of the housing is capped by a domed header 54 which is fixed to the wall 46 at flanges 56. The header 54, in effect, forms a mixing chamber through which air from the flowpath 50 can pass before it enters the combustion chamber.

Figure 3:
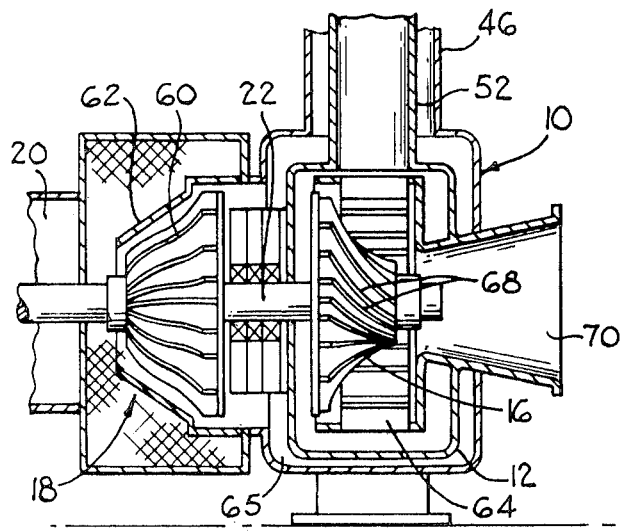
FIG. 3 is a cross-section through the engine on the line III—III in FIG. 2.

The compressor 18 is provided within a filter housing 58. The compressor has a bladed compressor rotor 60 mounted on the shaft 22 and a compressor intake casing 62 (FIG. 3) surrounding the compressor rotor 60. The compressor is arranged to drive air through the housing 10, past the rotor chamber 12 through annular gap 65 and into the flowpath 50 so that pre-heated air flows through the mixing chamber 56 and into the combustion chamber 14.

Figure 5:
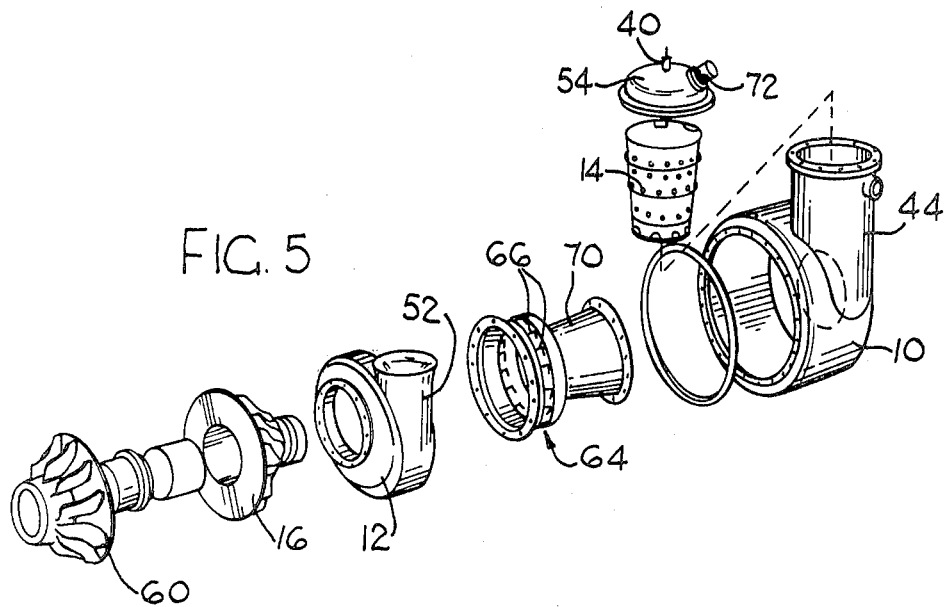
FIG. 5 is a schematic, exploded, partial view showing parts of the engine.
Figure 6:
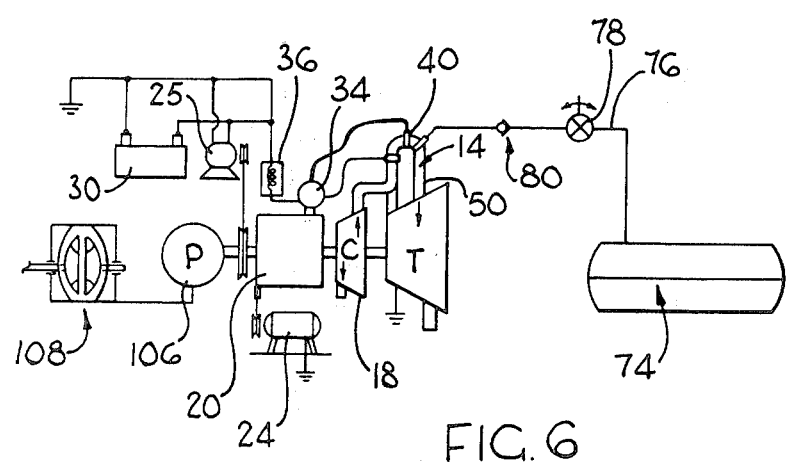
FIG. 6 is a representative diagram of the engine.

The rotor chamber 12 contains a turbine guide vane assembly 64 which is arranged in the rotor housing so that combustion gases flowing from the combustion chamber flow around a path 67 of progressively descreasing flow area and are forced to pass between guide vanes 66 of the guide vane assembly. The rotor 16 has blades 68 which are curved as shown in FIG. 5 so that they operate efficiently when impinged on by gases flowing between the guide vanes 66. A diffuser 70 forms an outlet from the rotor chamber and gases flowing between the guide vanes and past the rotor blades are compelled to pass out of the rotor chamber through the diffuser 70.

In order to supply combustible gases to the combustion chamber, a multi-apertured element 72 is fixed in the header 54 and arranged to supply and disperse combustible gases into the mixing chamber formed within header 54. This element is connected to a large gas container 74 containing propane by a supply line 76. The supply line includes a supply valve 78 and a control valve 80. The supply valve 78 is a gas cock having a body defining a flow passage 81 and regulating means in the form of a pivoting arm 83 for moving a control member within the valve and varying the flow area of the flow passage. The regulating means is arranged so that it can be moved through an operating angle of for example up to 90 degrees, in which time the flow passage alters from its fully closed condition to its fully open condition.

Figure 4:
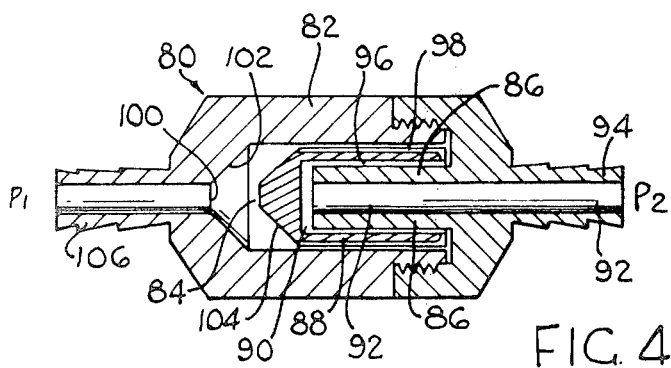
FIG. 4 is a schematic cross-section through a control valve forming part of the engine.

The control valve 80, which is shown in FIG. 4, includes a valve body 82 defining a control chamber 84 of circular cross-section. An outlet member 86 extends into the chamber and a shuttle piston 88 having a cylindrical cavity 90 therein is located in the chamber with the outlet member extending to within the cavity. The piston 88 is freely mounted in the chamber 84 without springs or like restraints acting thereon. An outlet passage 92 passes through the outlet member 86 and to an outlet connector 94 secured in the supply line 76.

A flowpath 96 is formed by the spacing between the inner wall of the cylindrical cavity 90 and the outer surface of the outlet member 86. This flowpath, together with longitudinally extending grooves 98 in the outer surface of the shuttle piston permit fluid communication between the outlet and all parts of the chambers 84.

The portions of the shuttle piston between the grooves can slidably engage the inner chamber wall and the piston is thus guided for movement within the control chamber. The size of the spacing between the outlet member and the piston and the dimensions of the grooves may be altered suitably to adjust the rate at which gas can flow to the outlet.

The control chamber 84 has a frusto-conical inlet end having a gas inlet 100 bordered by a frusto-conical valve seat 102. The shuttle piston is provided with a complementary frusto-conical closure surface 104 for engaging the valve seat to close the inlet 100. The inlet extends through an inlet connector 106 which is fixed in the supply line 76.

In order to provide a suitable gas supply to the control valve 80 and thus to the combustion chamber, a gas pressure equilisation system can be used for providing a substantially constant pressure gas supply.

The gearbox 20 has a drive shaft connected to an hydraulic pump 106 for moving a working fluid. This working fluid can be supplied to an hydraulic motor 108, including any suitable hydraulic coupling. The coupling may be reversible and may be connected to an output unit, such as differential gearing.

In operation, the rotor and compressor are initially operated by the starter motor and combustible gas is fed into the control chamber 84 from the supply system 106. The shuttle piston 88 is driven towards the outlet 92 by the pressure of the combustible gas being supplied into the chamber 84. The gas then flows past the shuttle piston and through the outlet and eventually into the element 72, where it is dispersed and mixed with air being supplied through the flowpath 50 into the header 54 by the compressor 18. The sparking plugs 40 are made to spark intermittently by the distribution system 45 and ignite the resulting gas-air mixture as it flows from the header into the combustion chamber 14 through openings 49. Because of the manner in which the mixture is fed into the chamber 14, combustion is effected across a relatively broad front. This permits effective combustion in the chamber 14. The burning gases are supplied into the rotor chamber and between the vanes 66 so that they impinge on the blades of the rotor 16 and rotate the rotor.

Using a housing 10, rotor chamber 12, rotor 16 and compressor 18 which is a modified form of the Klöckner-Humboldt-Deutz AG injection fed diesel-burning turbine T16A or T216, it has been found that the turbine of the invention will operate effectively between about 20,000 and about 51,000 revolutions per minute with a substantially lower exhaust temperature than that of the original diesel-burning turbine. The combustion in the unit was more efficient and overall pollution was markedly less than with the diesel turbine.

During the normal operation of the engine, the shuttle piston 88 is intermittently driven towards the inlet 100 by back pressure $P_2$ created by the combustion of gases in the combustion chamber 14 each time gases in this chamber are ignited. The inlet is closed whenever the pressure in the air or combustion gases acting on the piston 88 is sufficiently high. The shuttle piston thus prevents air or combustion gases from flowing the wrong way through the control valve. Once the pressure $P_2$ of the combustion gases has been sufficiently exhausted in the combustion chamber for back pressure to drop below the effective pressure $P_1$ of the combustible gases from the cylinder 74, the pressure of the gas again drives the shuttle piston away from the inlet and further gas thus flows into the combustion chamber. It has been found that wear on the shuttle piston is minimal in use, possibly because the piston floats on a cushion of gas between the piston and the outlet member. There are no springs or like members in the valve to wear or break.

The speed of rotation of the rotor can be adjusted relatively rapidly by controlling the flow area of the passage in the supply valve 78 by using the regulating means because of the particular construction of the engine.

Although the turbine can run efficiently on propane gas, the actual gas used will depend on particular applications and commercial supply.

I claim:

1. A combustion unit for using gaseous fuels, the unit including a combustion chamber; means for igniting combustion fluids in the combustion chamber; power output means drivable by the resulting combustion gases; a compressor for supplying air to the combustion chamber; and a gas supply including a control valve for supplying fuel gas to the combustion chamber for burning in the air, the control valve having a control chamber, an outlet member extending into the control chamber, an outlet passage in the outlet member and defining an outlet from the control chamber, said passage communicating with the combustion chamber to supply fuel gas to the combustion chamber, an inlet for supplying fuel gas into the control chamber and capable of communicating with the outlet, a valve seat in the control chamber and surrounding the inlet, and a shuttle piston movable along the outlet member, the shuttle piston having a closure surface for engaging the valve seat to close the inlet, wherein fuel gas flowing into the inlet holds the closure surface away from the valve seat and thus flows through the control chamber to the outlet and to the combustion chamber until combustion gases in the combustion chamber create a backflow to the outlet at a pressure sufficiently in excess of the pressure at the inlet to move the closure surface towards the valve seat and to close the inlet.

2. The unit of claim 1, wherein the shuttle piston contains a substantially cylindrical cavity receiving the outlet member, the cavity having an inner peripheral wall which is slightly spaced from the member so that a flow path is formed by an annular space between the inner wall of the piston and an outer wall of the outlet member.

3. The unit of claim 2, wherein the chamber is cylindrical and the outer surface of the piston can slidably engage the wall of the chamber, the piston containing grooves to place the inlet in fluid communication with the flow path.

4. The unit of claim 2, wherein the gas supply comprises a gas source and a supply valve for regulating the flow of gas between the source and the control valve.

5. A unit of claim 1, wherein the combustion chamber is tubular with a header at one end and the compressor is arranged for feeding air though an air supply path to the header; the gas supply feeding gas to the header through dispersing means to mix with air from the flow path.

6. The unit of claim 5, further comprising a primary housing with an outside wall and an inner peripheral wall defining the combustion chamber, the header being mounted on the outside wall and the air supply path being provided between the inner and outer walls.

7. The unit of claim 5, wherein the power output means is a rotor provided at an opposite end of the combustion chamber to the header for being rotated by combustion gases flowing from the combustion chamber.

8. The unit of claim 7, wherein the rotor is rotatable in a rotor chamber about an axis substantially perpendicular to but offset from said combustion chamber, the combustion chamber extending non-radially into the rotor chamber for impinging non-radially on the rotor to rotate the rotor.

9. The unit of claim 7, wherein a plurality of blades are located about the periphery of the rotor, each blade being curved as it extends along the rotor axis for deflecting combustion gases towards a diffuser forming an exhaust outlet leading from the rotor chamber.

10. A combustion unit comprising:
a tubular combustion chamber;
a header at one end of the chamber;
an air supply path for supplying air into the header;
a compressor for feeding air through the air supply path to the header;
a supply and control system for feeding gas to the header to mix with air from the flow path;
means for igniting air-gas mixture flowing through the header and into the combustion chamber; and
a rotor at an opposite end of the combustion chamber to be rotated by combustion gases flowing from the combustion chamber;
the supply and control system including: a gas source and a control valve including closure means responsive to gas pressure from said gas source and said combustion chamber for permitting gas to flow into said header when a back pressure force applied to the closure means by back pressure from the combustion chamber is less than a gas pressure force applied to the closure means by gas from the gas source, the closure means being operable to close off supply of gas from the gas source on the back pressure force exceeding the gas pressure force on the closure means;
the supply and control system further comprising a supply line from the gas source and a supply valve in said supply line and including regulating means for varying the flow of gas through said supply line, and the control valve having an inlet in fluid communication with said supply line, a control chamber, an outlet member extending into the chamber, a passage in the outlet member and defining an outlet from the chamber, a shuttle piston movable freely along the outlet member and forming the closure means, a flow path between the piston and outlet member for placing the passage in continuous fluid communication with the chamber, the inlet opening into the chamber and being capable of communicating with the outlet via the chamber, a valve seat surrounding the inlet, and a closure surface movable with the piston for engaging the valve seat to close the inlet.

11. A combustion unit according to claim 10, wherein the shuttle piston contains a substantially cylindrical cavity receiving the outlet member, the cavity having an inner peripheral wall which is slightly spaced from the member so that a flow path is formed by an annular space between the inner wall of the piston and the outer wall of the outlet member.

12. A combustion unit according to claim 11, wherein the chamber is cylindrical and the outer surface of the piston can slidably engage the wall of the chamber, the piston containing grooves to place the inlet in fluid communication with the flow path.

13. A combustion unit having an output rotor rotatable at a variable speed, a primary housing with an outer wall, a substantially cylindrical inner peripheral wall disposed about an axis and defining a combustion chamber and a header mounted on the outside wall at one end of the combustion chamber; a rotor rotatable in a rotor chamber about an axis transverse to but offset from the axis of the inner wall, the combustion chamber extending non-radially into the rotor chamber for enabling combustion gases to impinge non-radially on the rotor to rotate the rotor; a plurality of blades located about the periphery of the rotor, each blade being curved as it extends along the rotor axis to deflect combustion gases towards an exhaust outlet leading from the rotor chamber; an air supply path for supplying air between the inner and outer walls and into the header; a compressor drivable by said rotor at a speed proportional to the speed of said rotor for feeding air through the air supply path to the header; a gas source; a supply line from the gas source; a supply valve in said supply line and including regulating means for varying the flow of gas through said supply line; a control valve having an inlet in fluid communication with said supply line, a control chamber, an outlet member extending into the chamber, a passage in the outlet member and defining an outlet for placing the chamber in fluid communication with the combustion chamber and supplying gases to the header to mix the air from the compressor, a shuttle piston movable freely along the outlet member and forming a closure member for closing the inlet, a flow path between the piston and outlet member for placing the passage in continuous fluid communication with the chamber, the inlet opening into the chamber and being capable of communicating with the outlet via the chamber when not closed by the shuttle piston; and means for igniting the air-gas mixture whereby gases from the chamber drive the rotor; the shuttle piston being movable from the inlet for permitting gas to flow into said header when a back pressure force applied to said piston by back pressure from the combustion chamber is less than a gas pressure force applied to the closure means by gas from the gas source and being movable to close the inlet and shut off supply of gas from the gas source on the back pressure force exceeding the gas pressure force on the closure means.

14. A combustion unit according to claim 13, wherein the shuttle piston contains a substantially cylindrical cavity receiving the outlet member, the cavity having an inner peripheral wall which is slightly spaced from the member so that a flow path is formed by an annular space between the inner wall of the piston and the outer wall of the outlet member.

15. A combustion unit according to claim 14, wherein the chamber is cylindrical and the outer surface of the piston can slidably engage the wall of the chamber, the piston containing grooves to place the inlet in fluid communication with the flow path.

* * * * *